(12) United States Patent
Jacobsen et al.

(10) Patent No.: US 9,186,022 B1
(45) Date of Patent: Nov. 17, 2015

(54) MIXING BLADE FOR BLENDING APPARATUS AND METHODS

(75) Inventors: Joseph O. Jacobsen, American Fork, UT (US); C. David Voorhees, Spanish Fork, UT (US); Thomas D. Dickson, Jr., Orem, UT (US)

(73) Assignee: BLENDTEC, INC., Orem, UT (US)

( * ) Notice: Subject to any disclaimer, the term of this patent is extended or adjusted under 35 U.S.C. 154(b) by 1211 days.

(21) Appl. No.: 12/901,992

(22) Filed: Oct. 11, 2010

(51) Int. Cl.
*A47J 43/046* (2006.01)
*B01F 7/18* (2006.01)
*A47J 43/07* (2006.01)
*B01F 7/00* (2006.01)

(52) U.S. Cl.
CPC ............ *A47J 43/046* (2013.01); *A47J 43/0716* (2013.01); *A47J 43/0711* (2013.01); *A47J 43/0727* (2013.01); *B01F 7/00275* (2013.01)

(58) Field of Classification Search
CPC . A47J 43/0716; A47J 43/0722; A47J 43/046; A47J 43/0727; B01F 7/0025; B01F 2013/108; B01F 7/162; B01F 7/00275
USPC ............ 366/330.3, 330.7, 205; 416/202, 237; 241/282.1, 292.1
See application file for complete search history.

(56) References Cited

U.S. PATENT DOCUMENTS

| | | | | |
|---|---|---|---|---|
| 2,585,255 A * | 2/1952 | Kochner et al. | ............ | 241/282.2 |
| 2,757,909 A * | 8/1956 | Wayne | ........................ | 241/282.2 |
| 2,771,111 A * | 11/1956 | Seyfried | ...................... | 241/292.1 |
| 2,788,038 A * | 4/1957 | Corcoran | .................. | 241/292.1 |
| 2,940,738 A * | 6/1960 | Posener et al. | ................ | 366/205 |
| 3,024,010 A * | 3/1962 | Sperling | ........................ | 366/314 |
| 3,216,473 A * | 11/1965 | Dewenter | ...................... | 241/167 |
| 3,240,246 A * | 3/1966 | Dewenter | ........................ | 241/98 |
| 3,856,220 A * | 12/1974 | Waters | ........................ | 241/282.1 |
| 4,054,272 A * | 10/1977 | Cooke | .......................... | 366/343 |
| 4,723,719 A * | 2/1988 | Williams | .................. | 241/282.2 |
| 4,896,971 A * | 1/1990 | Weetman et al. | .......... | 366/330.2 |
| 5,052,892 A * | 10/1991 | Fasano | ...................... | 416/204 R |
| 5,100,240 A * | 3/1992 | D'Alterio | ...................... | 366/99 |
| 5,487,511 A * | 1/1996 | Sansone et al. | ............ | 241/282.1 |
| 5,647,546 A * | 7/1997 | Sinovas et al. | ............. | 241/292.1 |
| 5,655,834 A * | 8/1997 | Dickson | ........................ | 366/205 |
| 5,823,672 A * | 10/1998 | Barker | ......................... | 366/205 |
| 5,839,826 A * | 11/1998 | Eubanks | ....................... | 366/315 |
| 6,106,232 A * | 8/2000 | Wagner | ......................... | 416/202 |
| D433,282 S * | 11/2000 | Bohannon et al. | ............. | D7/412 |
| 6,666,574 B1 * | 12/2003 | Pryor | ............................ | 366/205 |
| 6,811,303 B2 | 11/2004 | Dickson, Jr. | | |
| 6,974,099 B2 * | 12/2005 | Kolar et al. | ................ | 241/282.1 |
| 7,207,506 B1 | 4/2007 | Dickson, Jr. et al. | | |
| 7,278,598 B2 | 10/2007 | Katz et al. | | |
| 7,552,855 B2 | 6/2009 | Vargas et al. | | |
| 7,641,380 B2 * | 1/2010 | Behar et al. | .................... | 366/205 |
| 8,056,848 B1 * | 11/2011 | Liang | ......................... | 241/292.1 |
| 2002/0139884 A1 * | 10/2002 | Williams et al. | ........... | 241/282.1 |
| 2005/0002271 A1 * | 1/2005 | Kolar et al. | ................... | 366/205 |
| 2008/0142625 A1 * | 6/2008 | Doppstadt | ..................... | 241/194 |
| 2008/0148949 A1 * | 6/2008 | Wolfe | ............................ | 99/275 |
| 2008/0198691 A1 * | 8/2008 | Behar et al. | .................. | 366/205 |
| 2012/0080549 A1 * | 4/2012 | Rukavina | .................. | 241/282.1 |
| 2012/0314533 A1 * | 12/2012 | Wang | ........................... | 366/292 |

* cited by examiner

Primary Examiner — Tony G Shoohoo
(74) Attorney, Agent, or Firm — Holland & Hart

(57) ABSTRACT

A blade configured for use in a blending apparatus includes a body portion and a pair of wing portions extending from the body portion. At least a leading edge of the blade is forged to increase a hardness property. The leading edge may have a minimum thickness that provides a relatively blunt leading edge. The wing portions of the blade may be formed after forging the blade.

12 Claims, 11 Drawing Sheets

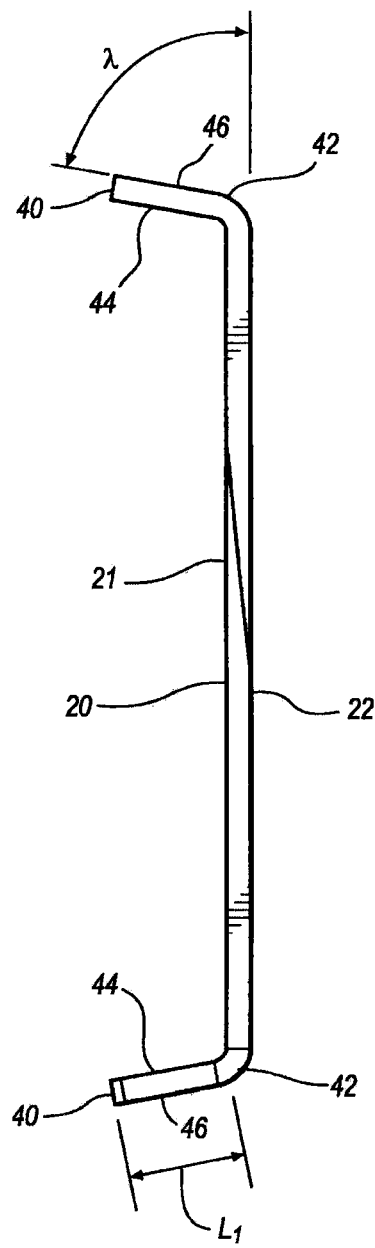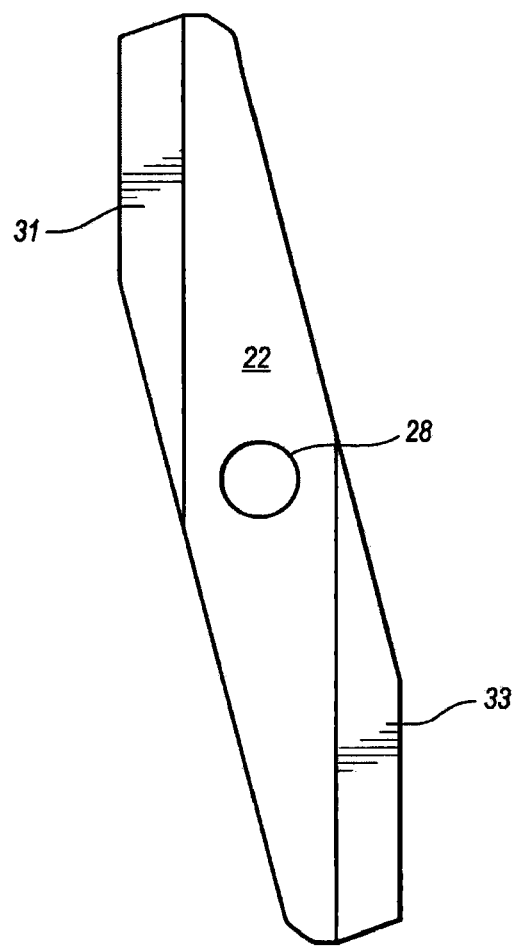
FIG. 5
FIG. 6

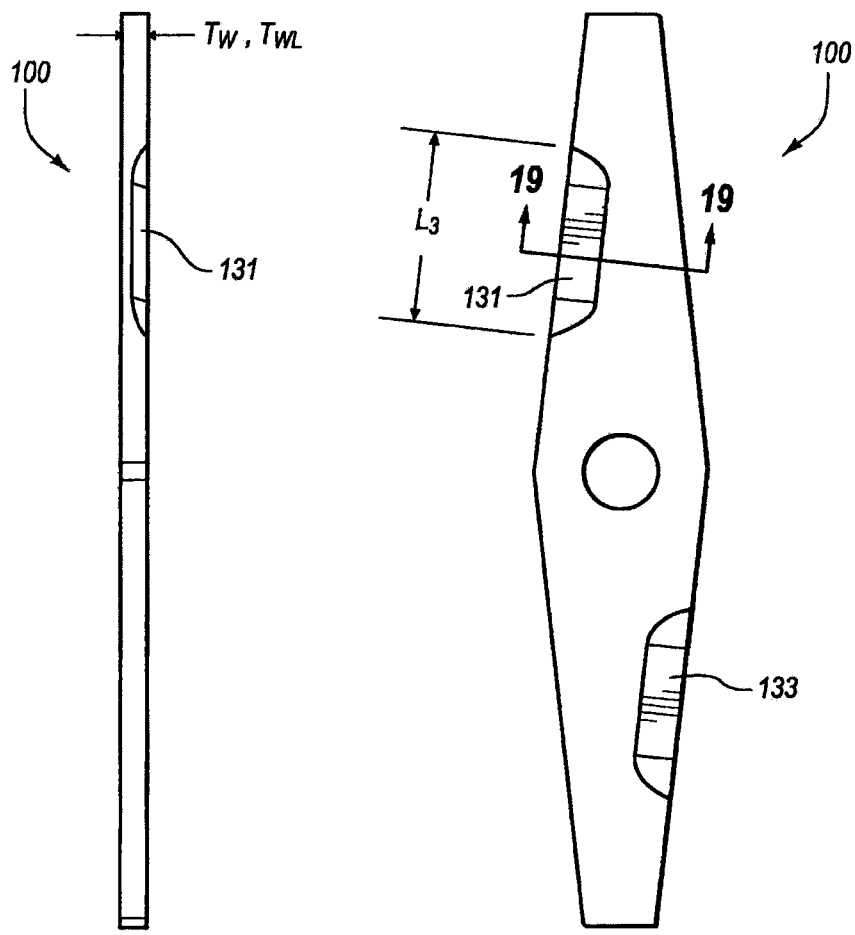
FIG. 18    FIG. 17
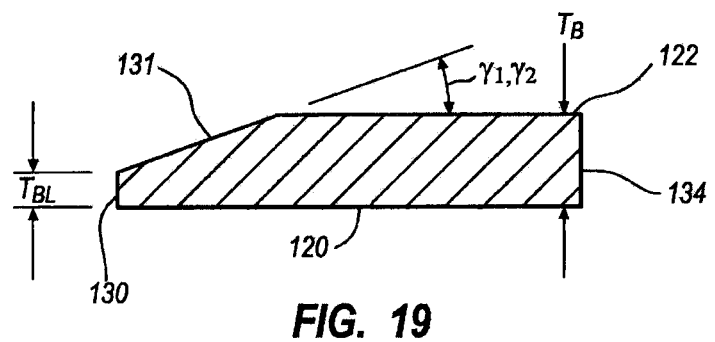
FIG. 19

MIXING BLADE FOR BLENDING APPARATUS AND METHODS

TECHNICAL FIELD

This invention relates to blending devices, and more particularly to blending blades for use in blending devices capable of high-volume, rapid-succession production of blended beverages.

BACKGROUND

Food processors and blending devices have existed for many years. One example of a blending device is shown and described in U.S. Pat. Nos. 5,655,834 and 6,979,117, which are incorporated herein in their entirety by this reference.

Food processors and blending machines are being used now more than ever, particularly in the high-volume, commercial beverage industry. People are increasingly becoming aware of the benefits, in terms of taste and quality, of well-processed beverages. Blended fruit smoothies and similar fruit drinks, popular with all types of people ranging from the fitness conscious to the less active, require a food processor or blending machine. Cold beverages, in particular, which utilize fruit (frozen or fresh) and ice to prepare present unique challenges in beverage preparation. An appropriate blending machine will break down the ice, frozen fruit, and other ingredients in attempting to achieve an ideal uniform drink consistency. In addition, food processors or blending machines are ideal for mixing nutritional supplements into beverages while similarly attempting to achieve an ideal uniform drink consistency.

In addition to the recent increase in the popularity of smoothies, food processors and blending machines are being used to produce many new and different beverages. For example, different types of coffees, shakes, dairy drinks, and the like are now commonly served at many different types of retail business locations. Consumers are demanding more diversity and variety in the beverages available at these smoothie and other retail stores. The keys to producing a high quality beverage, irrespective of the specific type of beverage, are quality ingredients and a high quality blending machine that will quickly and efficiently blend the ingredients to produce a drink with uniform consistency.

All blending machines include some type of rotatable blending blade. The blending blade typically moves at relatively high rotational speeds to blend the ingredients. Blending blades typically include a sharpened leading edge that penetrates and cuts the ingredients as the blade rotates. Maintaining sharpness of the leading edge of the blending blade over extended use of the blending machine is often one design objective for blending blades. Increased sharpness of the blending blade usually minimizes the amount of power required to operate the blending machine to blend ingredients.

The blending blade may also have a unique bent shape that improves mixing of the ingredients. The bent shape may change over extended use of the blending machine or in response to blending certain ingredients such as ice or other hard materials.

Blending machines may benefit from improvements in blending blades.

SUMMARY

One aspect of the present disclosure relates to a blending blade that includes a body portion, a first blade wing, and a second blade wing. The body portion has an upper surface and a lower surface, a body thickness defined between the upper and lower surfaces, a first body leading edge, a second body leading edge, and an aperture defining an axis of rotation for the blending blade. The first blade wing extends from the upper surface of the body portion and has a first blade thickness and a first wing leading edge. The second blade wing extends from the upper surface of the body portion and has a second blade thickness and a second wing leading edge. Each of the first and second wing leading edges and the first and second body leading edges have a thickness of at least 0.005 inches.

The thickness of the wing leading edge may be no greater than the first blade thickness or the second blade thickness, and the thickness of the body leading edge may be no greater than the body thickness. A thickness of the first or second wing leading edge may be at least 5% of the first blade thickness or the second blade thickness, respectively. A thickness of the body leading edge may be at least 5% of the body thickness. The body leading edge may be arranged perpendicular to the lower surface of the body portion. At least one of the body portion and first and second blade wings may include a bevel that terminates at the body leading edge and the first and second wing leading edges, respectively.

The bevel may be continuous from the body leading edge to at least one of the first and second wing leading edges. The bevel may be defined using a cold forging process. At least one of the body leading edge and the first and second wing leading edges may have an increased hardness relative to other portions of the blending blade. The body portion may include a variable hardness across a thickness of the body portion. At least one of the first and second blade wings may include a variable hardness across a thicknesses of the first and second blade wings.

Another aspect of the present disclosure relates to a blender apparatus that includes a stationary base, a housing mounted to the stationary base, a motor mounted within the housing, and a mixing container having a blade. The blade is configured to blend contents held within the mixing container. The mixing container is removably securable to the housing for operable connection of the blade to the motor. The blade includes a body portion, first and second blade wings, and a leading edge. The body portion has an upper surface, a lower surface, and a body thickness. The first and second blade wings extend from the body portion. The leading edge is defined at least in part by at least one of the body portion and the first and second wing portions. The leading edge has a thickness that is at least 5% of the body thickness.

The leading edge of the blade may have a thickness of at least 0.005 inches. The blade may include a bevel terminating at the leading edge. A portion of the leading edge defined by the body portion may be oriented at a perpendicular angle relative to at least one of the top and bottom surfaces. The blade may have a variable hardness through the body thickness.

A further aspect of the present disclosure relates to a method of forming a blade for use in a blending apparatus. The method includes providing an elongate planar piece of metal material having top and bottom surfaces, a leading edge, and a thickness measured between the top and bottom surfaces. The method further includes forging the piece of metal material to defined a beveled surface that terminates at the leading edge.

The method may also include bending the piece of metal material to form first and second wings at opposing ends of the piece of metal material. The method may include removing excess metal material from the leading edge after forging.

The method may include forming a pass-through aperture at a midpoint along a length of the piece of metal material, wherein the pass-through aperture defines an axis of rotation. The method may include forming a thickness of the leading edge to be at least 5% of the thickness of the piece of metal material. The method may include forming a thickness of the leading edge to be at least 0.005 inches. The step of forging may include forming the beveled surfaces along opposing side edges of the piece of metal material.

The foregoing and other features, utilities and advantages of the invention will become apparent from the following detailed description of the invention with reference to the accompanying drawings.

BRIEF DESCRIPTION OF THE DRAWINGS

FIG. 5 is a side view of the blending blade of FIG. 1 in a partially bent state.
FIG. 6 is a bottom view of the blending blade of FIG. 5.
FIG. 17 is a bottom view of the blending blade of FIG. 11 in an unbent state.
FIG. 18 is a side view of the blending blade of FIG. 17.
FIG. 19 is a cross-sectional view of the blending blade of FIG. 17 taken along cross-section indicators 19-19.

DETAILED DESCRIPTION

Figure 22:
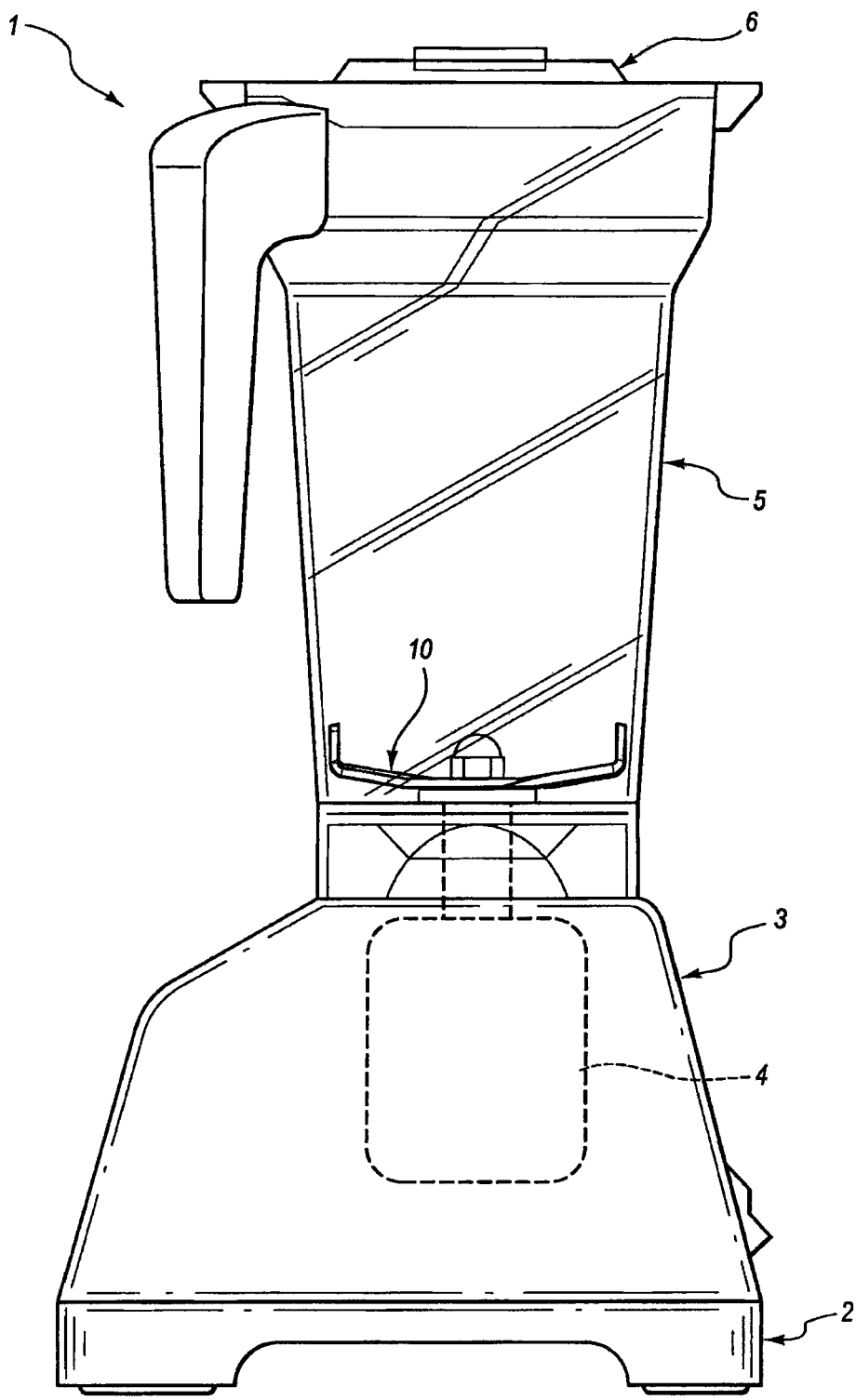
FIG. 22 is a side view of an example blending apparatus that includes the blending blade of FIG. 1.

The present disclosure relates to a blending apparatus 1 which, in one embodiment, the blending apparatus 1 is a stand-alone, portable blending device (see FIG. 22).

The blending device 1 comprises a stationary base 2, a motor housing or cover 3 and switches that cause the blender to operate. The blending device 1 further comprises a mixing container or jar 5 in which a mixing blade 10 is rotatably mounted. The blending device also comprises a lid 6 that covers the open end of the jar 5 during operation.

The housing or cover 3 comprises a shell-like cover structure that serves to hold and protect a motor 4 that drives the blending blade 10. Any suitable motor known to those skilled in the art may be utilized without departing from the spirit and scope of the present disclosure. The housing 3 may include a plurality of features that assist in connecting the motor 4 to the mixing blade 10. The housing 3 may be structured to allow an appropriate amount of air circulation underneath the blending apparatus 1 and about the motor 4.

The blade 10 is operably connected to the motor 4. Operation of the motor 4 rotates the blade 10 at variable speeds within the jar 5. The blade 10 may includes blade tips or winglets (referred to herein as first and second wing portions 14, 16) that extend upwardly substantially parallel to the walls of the jar 5. Typically, the overall length of the blade 10 is approximately between the range of about 2 inches to about 6 inches, and more preferably in the range of about 3 inches to about 4 inches. The blade 10 extends outwardly from its attached pivot location in a perpendicular manner.

One aspect of the present disclosure relates to the use of hardening processes such as forging or coining to harden portions of the blending blade (e.g., outer surfaces and the leading edge of the blending blade). Physical properties of the blade may be altered to increase hardness using a forging process that includes application of significant compression forces to portions of the blending blade. Providing a compression hardened leading surface of the blending blade may result in improved speed in breaking down the blended ingredients, and reduced wear and deformation of the blending blade during extended use such as during heavy commercial use, and more consistent product blending results.

Figure 20:
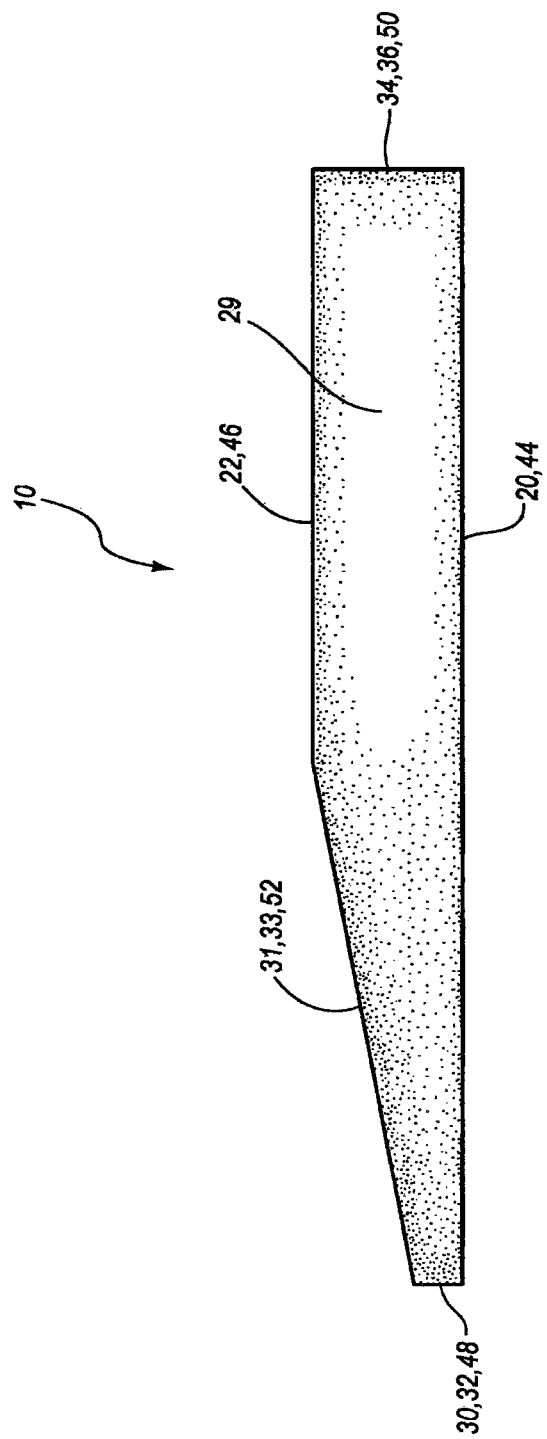
FIG. 20 is a cross-sectional view of an example blending blade showing a hardness profile.

Another aspect of the present disclosure relates to a hardness gradient through a thickness of the blending blade resulting from compression forging or coining of the blade. A forged or coined blade may exhibit a range of hardness starting from an outer shell of the blade moving toward a central core of the blade. In one example, the leading edge, beveled surface and remaining outer shell surfaces (also referred to as an exterior skin, exterior shell, or outer peripheral surface of the blade) have an hardness that gradually decreases towards a core of the blade. This gradient of hardness through the thickness of the blade may result in a casing or shell with high hardness and stiffness properties that gradually change to a more ductile center or core of the blade. Providing a less hard, more ductile core in the blade permits the blade to bend and flex, resulting in less fatigue cracking. FIG. 20 illustrates schematically an example hardness profile for blade 10.

The blending blade may be considered "fully forged" or "partially forged" depending on the extent to which the blending blade, or portions of the blending blade, are hardened in the forging process. For example, applying a compression force to only a bevel and leading edge of the blending blade may be considered partially forging the blending blade, whereas applying compression forces to substantially all exterior surfaces of the blending blade may be considered fully forging the blending blade.

Another aspect of the present disclosure relates to maintaining bent shapes of the blending blade. When using forging processes to increase hardening of certain features of the blending blade as described above, bent shapes formed into the forged blending blade may be maintained for longer periods of time and under more demanding uses (i.e., higher centrifugal forces and/or the blending of harder ingredients). The hardened casing or shell around the peripheral surfaces of the blending blade tends to provide a tube stiffener property in the blade that limits stretching or flexing of the bent features of the blade. A forged blending blade may be able to maintain its bent or other shaped construction and more reliably provide its intended function.

A further aspect of the present disclosure relates to features of the leading edge of the blending blade such as, for example, the extent to which the blade is sharpened at the leading edge.

Another aspect of the leading edge relates to where the leading edge of the blade is sharpened or otherwise reduced in thickness relative to the remaining portions of the blending blade.

Due to the rotational nature of blending blades, the linear velocity of a point on the blade increases at distances further from the drive shaft that rotates the blending blade. The blended product, such as the ingredients of a blended drink, is hit at a much higher velocity at the wingtips of the blade as compared to locations on the blade near the drive shaft. In one example, the blending blade rotates at about 30,000 rpm, resulting in a tip speed at the wingtips of the blending blade of between about 250 and 350 mph. At these relatively high speeds, blending of the drink ingredients may occur by exploding or fracturing the product into multiple smaller pieces rather than slicing or cutting off portions of the product. Providing a relatively blunt surface along the leading edge of at least portions of the blending blade increases the exploding and/or crushing of the product and reduces the cutting and/or slicing of the product, which may reduce the amount of time needed to break down the product into the desired blended drink.

A blending blade with a relatively blunt leading surface may provide a greater surface area for contacting the product at a more oblique angle as compared to a sharpened leading surfaces. Sharpened leading surfaces usually provide a glancing, less direct application of force to the product. Due at least in part to this more aggressive fracturing aspect of a relatively blunt blending blade design, the product may be more thoroughly blended in a shorter amount of time. Such blunt leading edge features of a blending blade may be incorporated into a blending blade having the forge hardened features described above.

Referring now to FIGS. 1-10, an example blending blade 10 is shown and described. The blending blade 10 includes a body portion 12 and first and second wing portions 14, 16. The blending blade 10 may include at least some of the hardened features described above, such as increased hardness along the leading edge and around a periphery or shell of the blending blade using a forging or coining process. Further, the blending blade 10 may include a relatively blunt leading edge surface that increases transfer of impact force to the product being blended thereby reducing the amount of time needed to blend the product. The blending blade 10 may also includes a plurality of bend features that are formed in the blending blade 10 after forging portions of the blending blade 10, thereby providing improved retention of the bend features in the blending blade 10 and improved blending.

The body portion 12 of the blending blade 10 may include an upper surface 20, a lower surface 22, first and second body leading edges 30, 32, and first and second body trailing edges 34, 36. The body portion 12 may further include first and second bevel portions 31, 33 that transition to the first and second body leading edges 30, 32, respectively. An aperture 28 may be formed centrally along the length of the body portion 12. A drive shaft of the blending apparatus (i.e., blending apparatus 1 shown in FIG. 22) may extend through the aperture 28 and be used to rotate the blending blade 10.

The first and second bevel portions 31, 33 may be positioned along the lower surface 22. The first and second body leading edges 30, 32 may be arranged at angles $\alpha_1$, $\alpha_2$ (see FIG. 2) relative to other features of the body portion 12 such as, for example, the first and second body trailing edges 34, 36, respectively.

Figure 9:
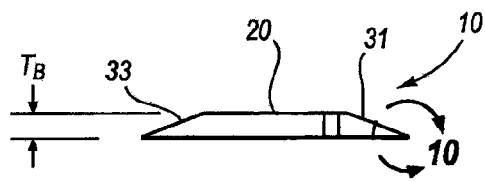
FIG. 9 is an end view of the blending blade of FIG. 7.
Figure 10:
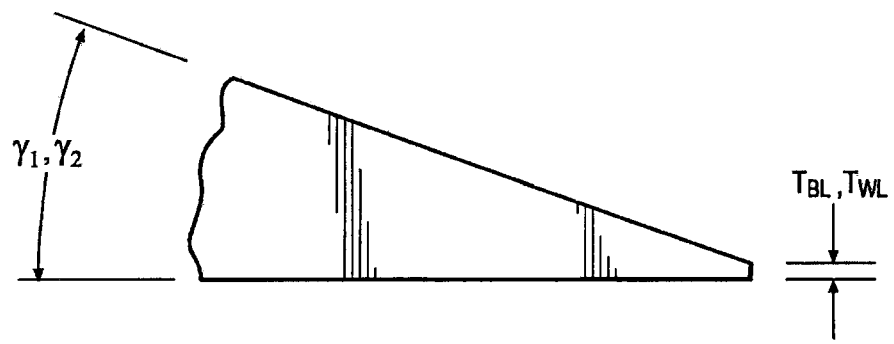
FIG. 10 is a detailed view of a portion of a leading edge of the blending blade shown in FIG. 9.
Figure 11:
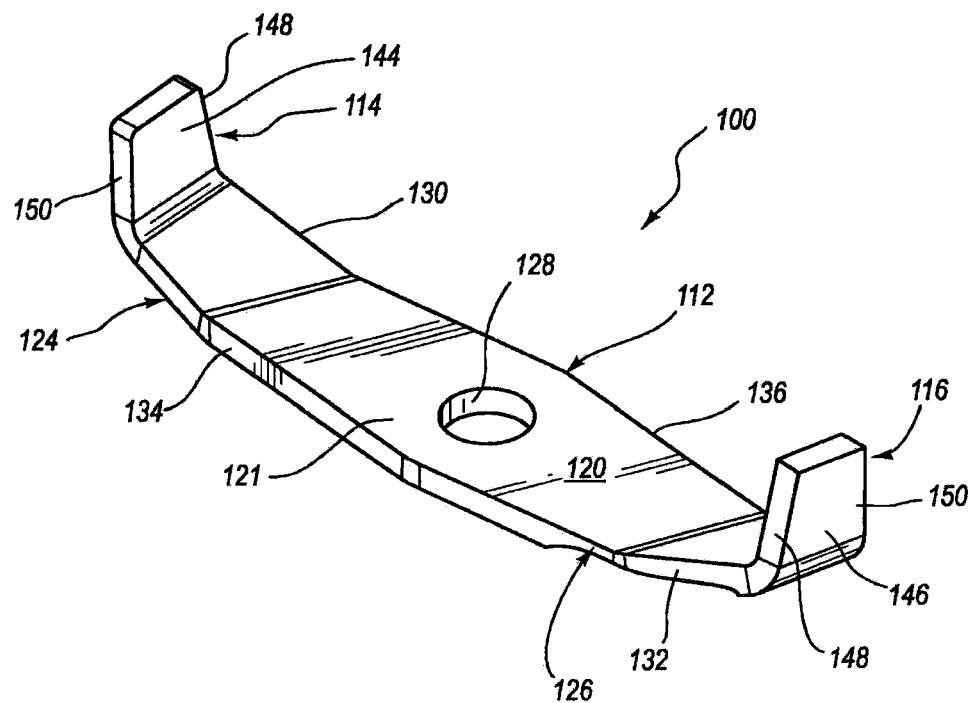
FIG. 11 is a perspective view of another example blending blade in accordance with the present disclosure.
Figure 12:
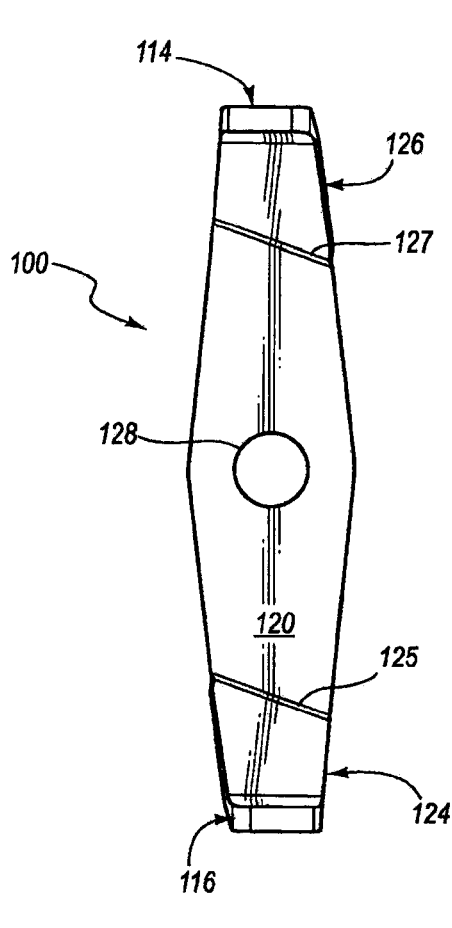
FIG. 12 is a top view of the blending blade of FIG. 11.
Figure 13:
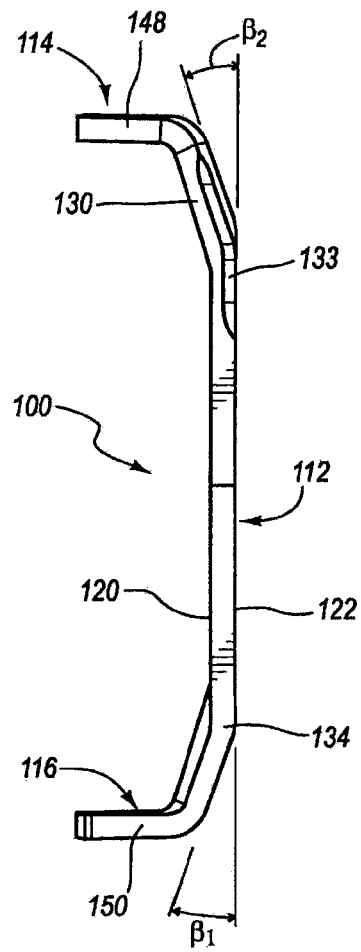
FIG. 13 is a side view of the blending blade of FIG. 11.
Figure 14:
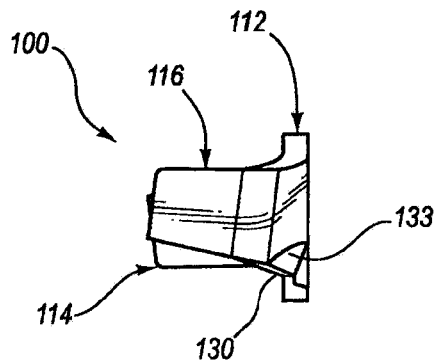
FIG. 14 is an end view of the blending blade of FIG. 11.
Figure 16:
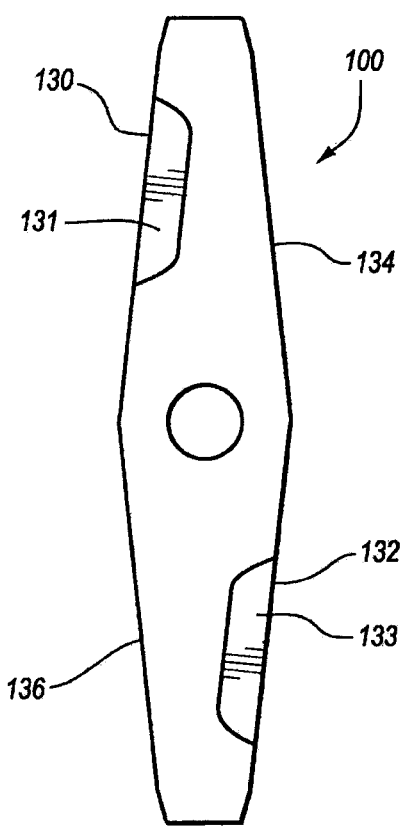
FIG. 16 is a bottom view of the blending blade of FIG. 15.
Figure 15:
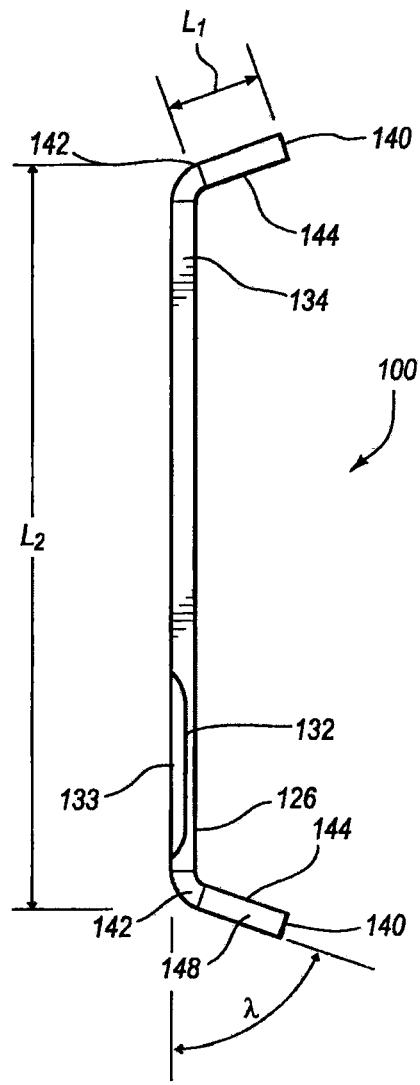
FIG. 15 is a side view of the blending blade of FIG. 11 in a partially bent state.

The body portion 12 may have a body thickness $T_B$ (see FIG. 9) and a body leading edge thickness $T_{BL}$ (see FIG. 10). The first and second bevel portions 31, 33 may have an angle $\gamma_1$, $\gamma_2$ relative to the upper and lower surfaces 20, 22 (see FIG. 10). The angle $\gamma_1$, $\gamma_2$ may be in the range of, for example, about 10 degrees to about 80 degrees, and more preferably in the range of about 15 degrees to about 30 degrees. The first and second bevel portions 31, 33 may be, for example, planer, concave, convex or have multiple angles.

Figure 1:
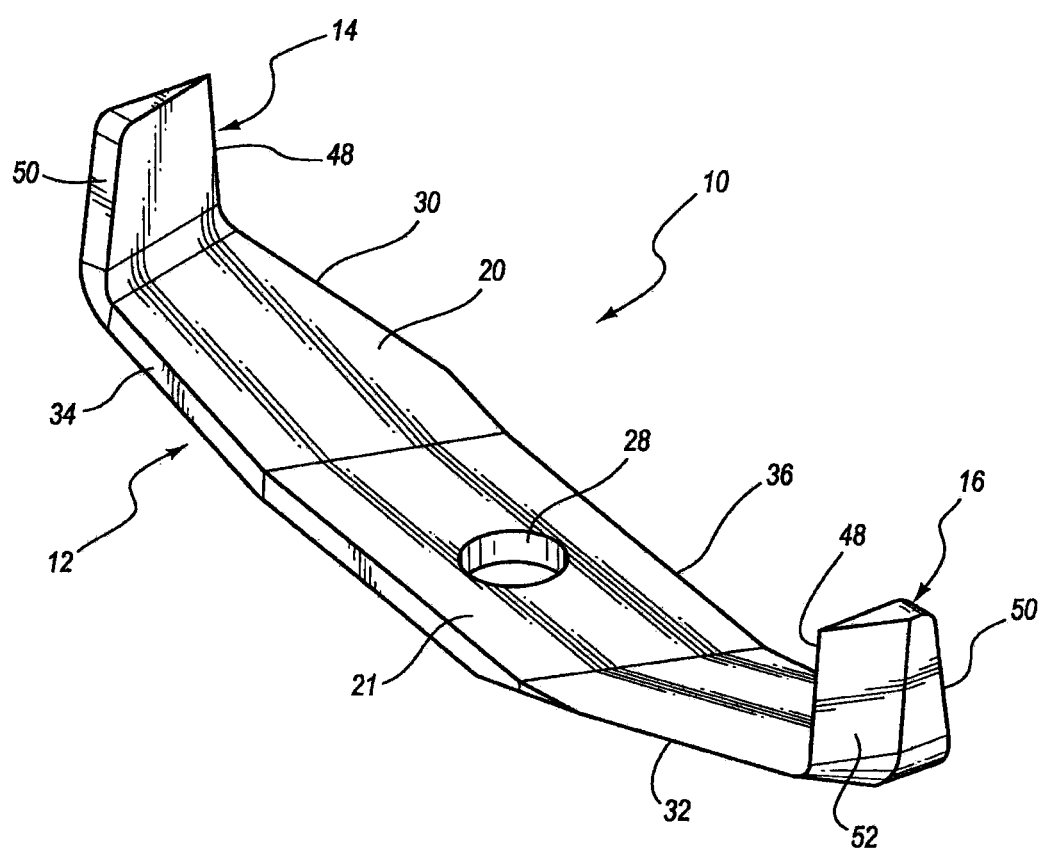
FIG. 1 is a perspective view of an example blending blade in accordance with the present disclosure.
Figure 4:
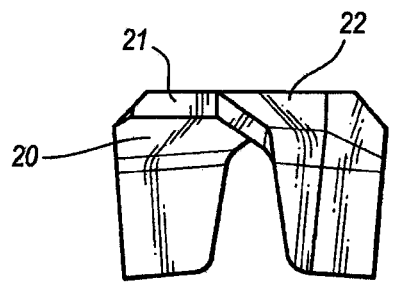
FIG. 4 is an end view of the blending blade of FIG. 1.
Figure 2:
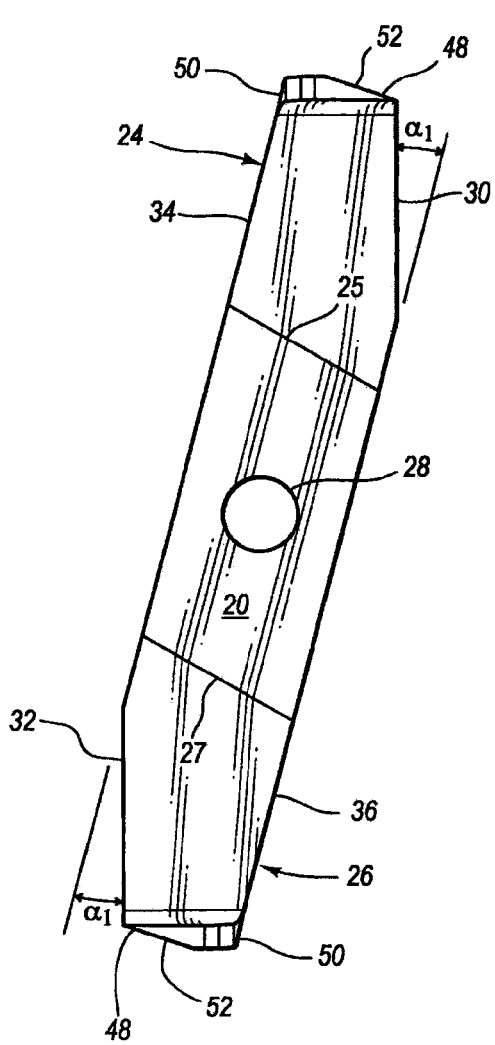
FIG. 2 is a top view of the blending blade of FIG. 1.
Figure 3:
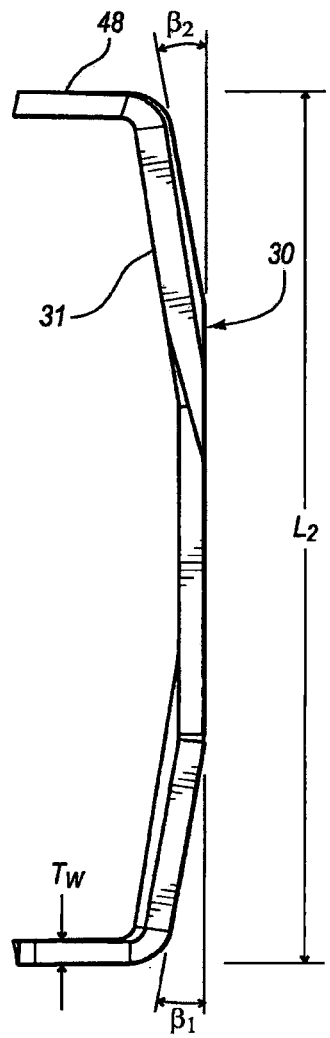
FIG. 3 is a side view of the blending blade of FIG. 1.

The body portion 12 may have first and second end portions 24, 26 that are bent upward relative to a central portion 21 (see FIGS. 1 and 4). The first and second end portions 24, 26 may be bent along first and second bend lines 25, 27 (see FIG. 2). The first and second end portions 24, 26 may be bent upward relative to the central portion 21 at an angle $\beta_1$, $\beta_2$ (see FIG. 3). The angle $\beta_1$, $\beta_2$ may be in the range of about 5 degrees to about 30 degrees, and more preferably in the range of about 10 degrees to about 15 degrees.

The first and second wing portions 14, 16 may each comprise a distal end 40, an attachment end 42 connected to the body portion 12, inward and outward facing surfaces 44, 46, a wing leading edge 48, and a wing trailing edge 50. A bevel portion 52 may be defined along the outward facing surface 46. The bevel portion 52 may be continuous with the first and second bevel portions 31, 33 of the body portion 12. The wing leading edge 48 may be continuous with the first and second body leading edges 30, 32. The wing trailing edge 50 may be continuous with the first and second body trailing edges 34, 36.

The first and second wing portions 14, 16 may have a wing thickness $T_W$ (see FIG. 3) and a wing leading edge thickness $T_{WL}$ (see FIG. 10). The bevel portion 52 may be arranged at a bevel angle $\gamma_1$, $\gamma_2$ (see FIG. 10). The bevel angle $\gamma_1$, $\gamma_2$ may be in the range of about 10 degrees to about 80 degrees, and more preferably in the range of about 15 degrees to about 30 degrees. The bevel angles $\gamma_1$, $\gamma_2$ may be the same. In some arrangements, the bevel angles $\gamma_1$, $\gamma_2$ may change along a length of the body portion 12 and first and second wing portions 14, 16.

The first and second wing portions 14, 16 may be arranged at a bend angle $\lambda$ (see FIG. 5) relative to the upper or lower surface 20, 22 of the central portion 21 prior to adding additional bending (e.g., bend angle $\beta_1$) to the body portion 12 along bend lines 25, 27. The bend angle $\lambda$ is typically in the range of about 45 degrees to about 90 degrees, and more preferably about 60 degrees to about 85 degrees.

The first and second wing portions 14, 16 may also have a length $L_1$ extending from the first and second end portions 24, 26. The length $L_1$ may be in the range of about 0.2 inches to about 1 inch, and more preferably in the range of about 0.4 inches to about 0.6 inches. The length $L_1$ may vary depending on a number of factors including, for example, a length $L_2$ of the body portion 12 (see FIG. 3). Typically, the longer the length $L_2$, the greater the possible range of lengths $L_1$ for the first and second wing portions 14, 16. Typically, the size, shape and bend angle $\lambda$ of each of the first and second wing portions 14, 16 is substantially equal. Such symmetry may be helpful in maintaining balance during rotation of the blending blade 10.

Referring to FIGS. 5 and 6, the first and second wing portions 14, 16 may be bent relative to the body portion 12 in a step prior to forming the bend angle $\beta_1$, $\beta_2$ at the bend lines 25, 27. In other arrangements, the bends in body portion 12 at bend lines 25, 27 are formed prior to forming the wing portions 14, 16.

Figure 7:
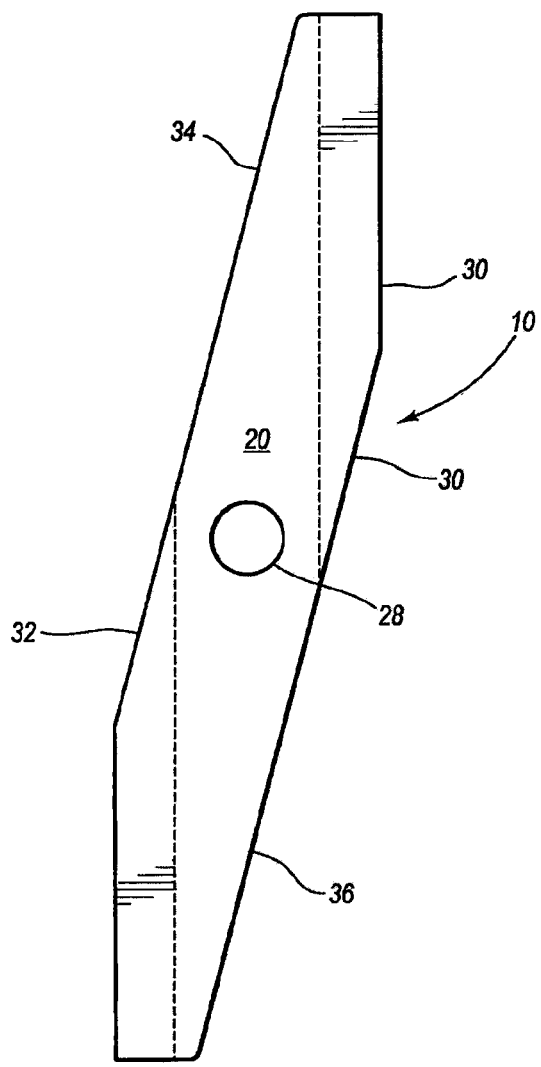
FIG. 7 is a top view of the blending blade of FIG. 1 in an unbent state.
Figure 8:
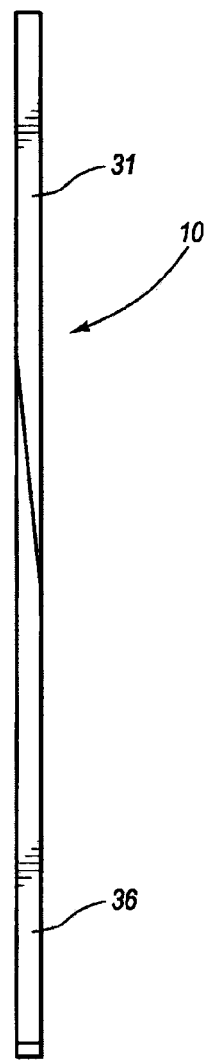
FIG. 8 is a side view of the blending blade of FIG. 7.

Referring to FIGS. 7-9, the first and second bevel portions 31, 33 may be formed in the blending blade 10 prior to any bending (e.g., bending to form the first and second wing portions 14, 16 into the angled orientation shown in FIGS. 1-6). A forging or coining process may be used to create the first and second bevel portions 31, 33 and the bevel portion 52 prior to forming any bend features in the blending blade 10. Application of high compression forces to the blending blade 10 may, in addition to forming the bevel features 31, 33, 52, induce hardening of portions of the blending blade 10. In at least some arrangements, forging the blending blade 10 may create increased hardening along at least the first and second body leading edges 30, 32 and the wing leading edge 48 of the first and second wing portions 14, 16. The forging process may result in a gradient hardness through a thickness of the blending blade 10 (e.g., see example hardness gradient profile in FIG. 20).

The darker shading shown in the cross-section of blending blade 10 in FIG. 20 relates to greater hardness. FIG. 20 shows the greatest hardness along the leading edge (i.e., leading edges 30, 32, 48) and the bevel surface (i.e., bevel surfaces 31, 33, 52). A hardened shell may be provided around an entire periphery or shell of the blending blade 10 such as, along surfaces 22, 46, surfaces 20, 44, and trailing surfaces 34, 36, 50.

A reduced hardness core 29 may be spaced from the peripheral surfaces or shell of the blending blade 10. The reduced hardness of the core 29 may provide increased ductility for the blending blade 10. A core 29 with increased ductility may have reduced incidence of fracture and an increase in the useful life of the blending blade 10. The increased hardness of the blending blade 10 along the leading edge, bevel, and peripheral surfaces or shell of the blending blade 10 for any of the body portion 12 and wing portions 14, 16 may provide increased transfer of forces to the product being blended, by providing increased breakup of the product and thereby a reduced amount of time to blend the product.

Other hardness profiles are possible for the blending blade 10 in addition to the schematic representations shown in FIG. 20. A greater thickness of hardened shell may be provided in other arrangements. In some arrangements, the increased hardness may be provided along limited portions of the periphery of the blending blade cross-section such as along primarily the leading edge and bevel features. In some arrangements, forming the bevel feature in the blending blade 10 includes applying a compression force to only a portion of the blending blade such as along what ultimately becomes the bevel feature (i.e., bevel feature 31, 33, 52). In some processes, application of the high compression force to any portion of the blending blade 10 results in a hardened shell around the periphery of the cross-section of the blending blade 10 as shown in FIG. 20 without application of a direct force to all periphery surfaces of the blending blade 10.

Referring now to FIGS. 11-19, another example blending blade 100 is shown and described. The blending blade 100 includes a body portion 112, a first wing portion 114, and a second wing portion 116. Blending blade 100 includes first and second bevel portions 131, 133 that are positioned along the body portion 112. The first and second wing portions 114, 116 do not include bevel features in this embodiment, but may include bevel portions or a reduced thickness portion along the leading edges 148. The first and second wing portions 114, 116 may have a wing leading edge thickness $T_{WL}$ that is substantially the same as the wing thickness $T_W$ (see FIG. 18).

The body portion 112 may include upper and lower surfaces 120, 122, first and second body leading edges 130, 132, first and second body trailing edges 134, 136, and first and second bevel portions 131, 133. An aperture 128 is formed in a central portion 121 (see FIG. 11) and may be used to connect the blending blade 100 to a drive shaft. The first and second wing portions 114, 116 extend from first and second end portions 124, 126, respectively. The first and second bevel portions 131, 133 may overlap or extend onto the central portion 121 and the first and second end portions 124, 126. In at least one example, the first and second end portions 124, 126 are defined at first and second bend lines 125, 127. The first and second bend lines 125, 127 may intersect with the first and second bevel portions 131, 133.

The bevel portions 131, 133 may have a reduced thickness along a length $L_3$. First and second end portions 124, 126 may extend at an angle $\beta_1$, $\beta_2$ (see FIG. 13) relative to the central portion 121. The first and second bevel portions 131, 133 may be arranged at an angle $\gamma_1$, $\gamma_2$ (see FIG. 19) relative to at least one of the upper or lower surfaces 120, 122. The body portion 112 may have a body thickness $T_B$ (see FIG. 19) and a body leading edge thickness $T_{BL}$ (see FIG. 19). The body portion 112 may have a length $L_2$ (see FIG. 15).

The first and second wing portions 114, 116 may each include a distal end 140, an attachment end 142 connected to the first and second end portions 124, 126, inward and outward facing surfaces 144, 146, and wing leading and trailing edges 148, 150. The wing leading edges 148 may extend continuously with the first and second body leading edges 130, 132. The wing trailing edges 150 may extend continuously with the body trailing edges 134, 136. The first and second wing portions 114, 116 may extend at an angle 2 relative to the upper or lower surface 120, 122 of the central portion 121 of the body portion 112 (see FIG. 15). The first and second wing portions 114, 116 may have a length $L_1$ (see FIG. 15).

The lengths $L_1$, $L_2$, angles $\beta_1$, $\beta_2$, $\gamma_1$, $\gamma_2$, $\lambda$ may have similar ranges of size as described above relative to blending blade 10. In at least some arrangements, the first and second bevel portions 131, 133 may extend at least in part onto at least one of the first and second wing portions 114, 116. In still further arrangements, a separate bevel portion may be provided on at least one of the first and second wing portions 114, 116, wherein the wing bevel portions are separate and distinct bevel features from the first and second bevel portions 131, 133. In still further arrangements, a bevel portion may be provided on the first and second wing portions 114, 116, and the first and second bevel portions 131, 133 are eliminated from the body portion 112. Many different sizes, shapes, arrangements, and constructions are possible for any bevel features on the blending blade 100.

Any one of the leading surfaces 130, 132, 148 may have a thickness relative to a thickness of the remaining portions of the body portion 112 or wing portions 114, 116. Typically, the leading edge thickness $T_{BL}$, $T_{WL}$ for the blending blades disclosed herein is at least 0.005 inches. In other arrangements, the thicknesses $T_{BL}$ and $T_{WL}$ are at least 0.01 inches, and in other arrangements at least 0.05 inches.

The thicknesses $T_{BL}$, $T_{WL}$ may be defined as a percentage of the thickness of the body or wing portions $T_B$, $T_W$, respectively. In at least one arrangement, the percentage is in the range of about 1% to about 100%, and preferably about 5% to about 100%. The percentage thickness of the leading edge relative to the body thickness and wing thickness may have a minimum thickness in the range of about 1% to about 50%, and more preferably about 5% to about 40% of a maximum thickness of the body and wing portions $T_B$, $T_W$. Thus, one aspect of the present disclosure is to intentionally maintain a minimum thickness at the leading edge of at least one of the body portions and first and second wing portions rather than providing sharpening of those leading edges wherein the thickness is intentionally reduced to a smallest dimension (i.e., thickness) possible.

The leading edge of the blending blade may be referenced as a leading face or leading surface of the blending blade. The leading surface may be arranged in a plane that is generally perpendicular to a plane of at least one of the top surface, bottom surface, or bevel surface of the body portion of the blending blade, or at least one of the inward surface, outward surface, or bevel surface of the wing portions of the blending blade. In some arrangements, the leading surface is arranged at a non-perpendicular angle, such as an angle in the range of about 60 degrees to about 89 degree relative to adjacent surfaces of the body or wing portions of the blending blade.

The process of forging a blending blade may include application of a compression force to at least one surface of the blending blade. In one example, the applied compression force is in the range of about 50 tons to about 200 tons of compression force, and more preferably in the range of about 100 to about 150 tons of compression force. The force may be applied in one application to the blending blade. In other arrangements, multiple or a series of applications of compression forces may be applied in separate forging steps.

Application of the compression force may displace material from a portion of the blending blade. In one example, the device that applies the compression force may be arranged at an angle representing the intended bevel angle for a bevel surface of the blending blade. Application of the compression force in the forging process may displace material from the blending blade, such as along the leading edge of the blending blade in a first forging step. In a follow-up forging step, another compression force is applied along the leading edge that shears off the displaced material to at least in part define the leading edge of the blending blade. In other arrangements, the displaced material may be removed by grinding, polishing, stamping, cutting, or other processing steps.

In at least some examples, forging the blending blade may increase toughness or hardness of certain portions of the blending blade by as much as an order of magnitude or greater toughness or hardness. Some portions around the periphery or shell of the cross-section of the blending blade may have a increased toughness or hardness as compared to other locations around the periphery as a result of the forging process, as described above with reference to FIG. 20.

Figure 21:
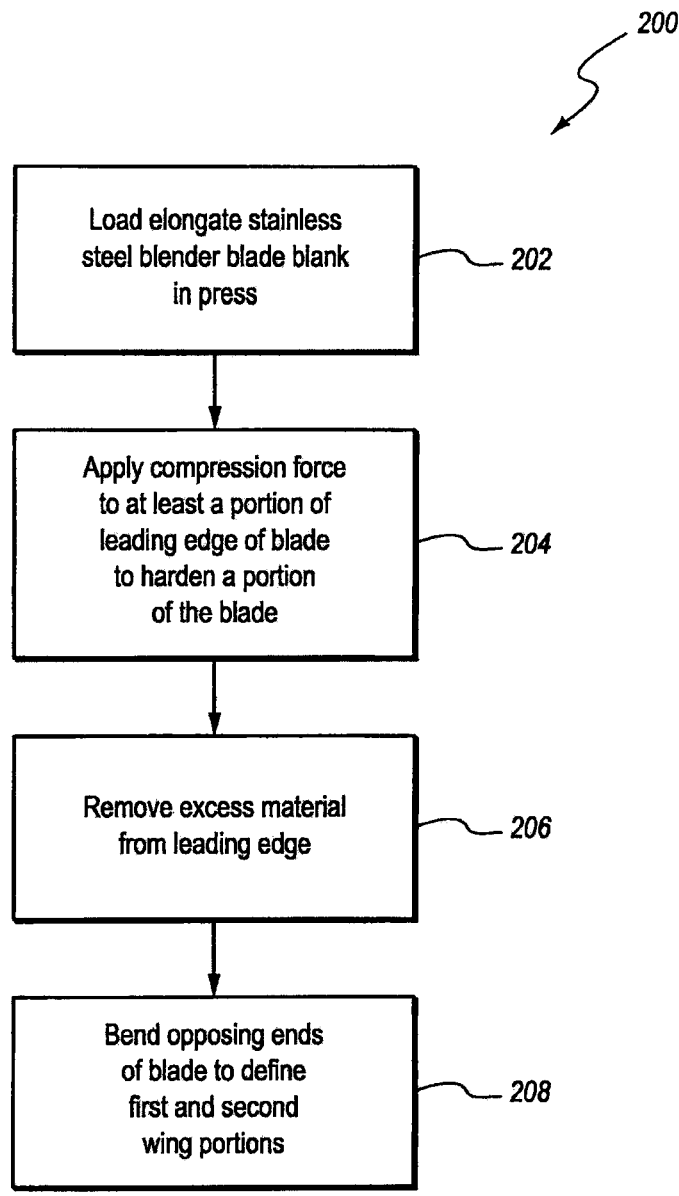
FIG. 21 is a flowchart illustrating steps of an example method of making a blending blade in accordance with the present disclosure.

Referring now to FIG. 21, an example method of forming or manufacturing a blending blade 200 is described. In a first operational step 202, an elongate stainless steel blending blade blank is loaded into a press. In a second operational step, a compression force is applied to at least a portion of the blending blade blank (i.e., a leading edge of the blending blade) to harden a portion of the blending blade. In a further operational step 206, excess material is removed from the blending blade, such as along a leading surface of the blending blade. In an additional operational step 208, opposing ends of the blending blade are bent to define first and second wing portions of the blending blade.

Additional or fewer steps are possible in the method 200 described above. For example, some blending blades may not require wing portions, which may eliminate the need for step 208. In another example, an additional step of applying an additional compression force to harden the same or an additional portion of the blending blade may be added.

The preferred materials for the blending blades described herein may include, for example, various grades of stainless steel or various grades of carbon steel, such as a carbon steel coated with a corrosion-resistant coating. A 300 series stainless steel may provide desired characteristics of hardness, ductility, and corrosion resistance.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the spirit of the invention. The words "including" and "having," as used in the specification, including the claims, shall have the same meaning as the word "comprising."

We claim:

1. A blending blade, comprising:
   a body portion having an upper surface and a lower surface, a body thickness defined between the upper and lower surfaces, an aperture for defining an axis of rotation for the blending blade, a first end portion extending from the body portion, the first end portion having a first body leading edge and a first body trailing edge, and a second end portion extending from the body portion, the second end portion having a second body leading edge and a second body trailing edge, wherein the first and second body leading edges are each partially arranged at angles relative to the first and second body trailing edges, respectively, and are each partially arranged parallel to the first and second body trailing edges, respectively;
   a first blade wing extending from the upper surface of the body portion, the first blade wing having a first blade thickness and a first wing leading edge, the first body leading edge terminating at the first blade wing;
   a second blade wing extending from the upper surface of the body portion, the second blade wing having a second blade thickness and a second wing leading edge, the second body leading edge terminating at the second blade wing;
   wherein each of the first and second wing leading edges and the first and second body leading edges having a thickness of at least 0.005 inches;
   wherein the first and second blade wings are configured to extend upward from the body portion at an angle between about 60 degrees to about 85 degrees relative to a bottom surface of the body portion at a location adjacent to the aperture.

2. The blending blade of claim 1, wherein the thickness of the wing leading edge is no greater than the first blade thickness or the second blade thickness, and the thickness of the body leading edge is no greater than the body thickness.

3. The blending blade of claim 1, wherein a thickness of the first or second wing leading edge is at least 5% of the first blade thickness or the second blade thickness, respectively.

4. The blending blade of claim 1, wherein a thickness of the body leading edge is at least 5% of the body thickness.

5. The blending blade of claim 1, wherein the body leading edge is arranged perpendicular to the lower surface of the body portion.

6. The blending blade of claim 1, wherein at least one of the body portion and first and second blade wings includes a bevel that terminates at the body leading edge and the first and second wing leading edges, respectively.

7. The blending blade of claim 6, wherein the bevel is continuous from the body leading edge to at least one of the first and second wing leading edges.

8. The blending blade of claim 6, wherein the bevel comprises a forge hardened surface.

9. The blending blade of claim 1, wherein at least one of the body leading edge and the first and second wing leading edges has an increased hardness relative to other portions of the blending blade.

10. The blending blade of claim 1, wherein the body portion comprises a body variable hardness across a thickness thereof.

11. The blending blade of claim 1, wherein at least one of the first and second blade wings comprises a wing variable hardness across a thicknesses thereof.

12. The blending blade of claim 1, wherein the leading edge defines a blunt surface configured to crush ingredients of a blended drink.

\* \* \* \* \*